March 14, 1933.   D. ELDER   1,901,496
SPRINKLER FLOW TIMING APPARATUS
Filed April 1, 1930
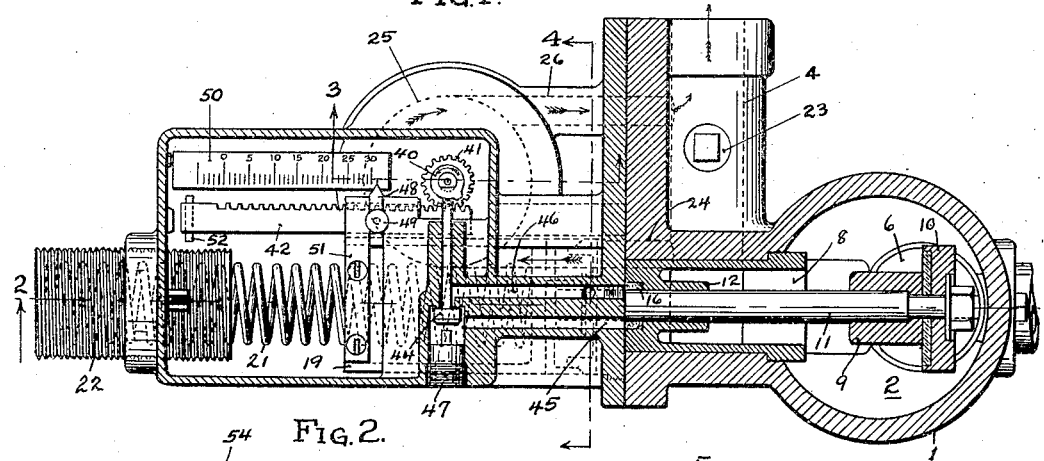
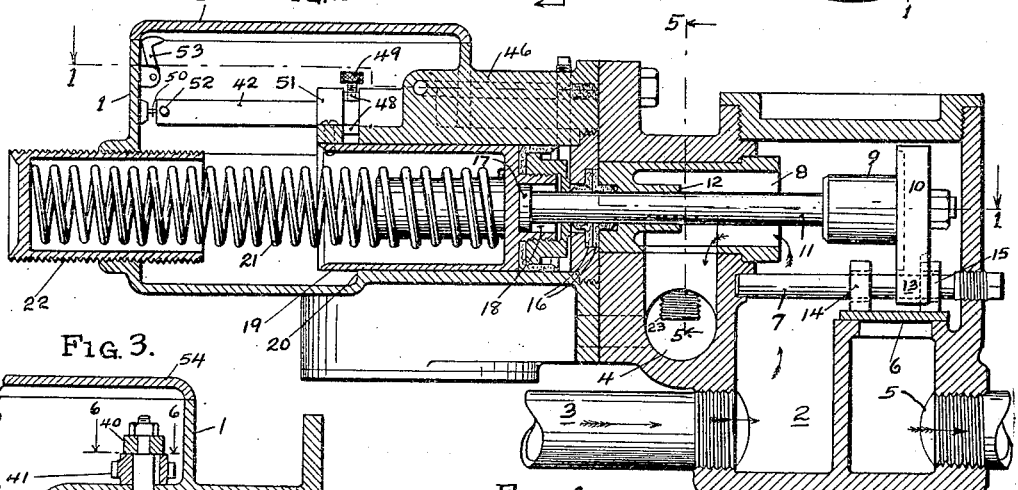
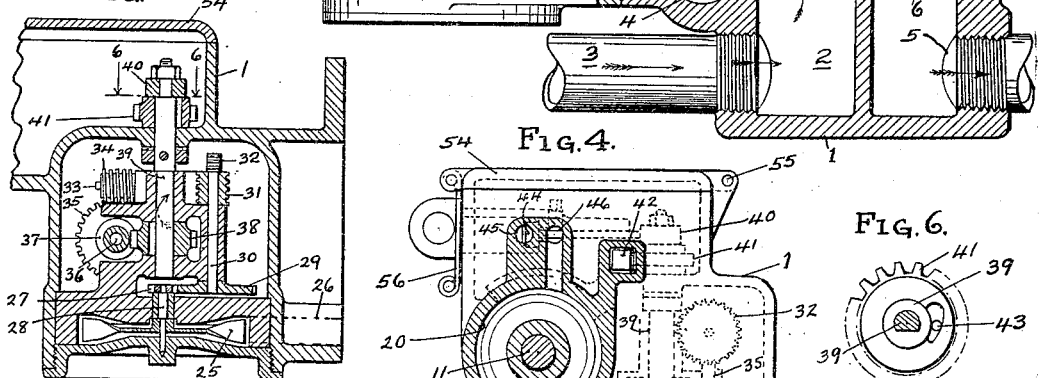
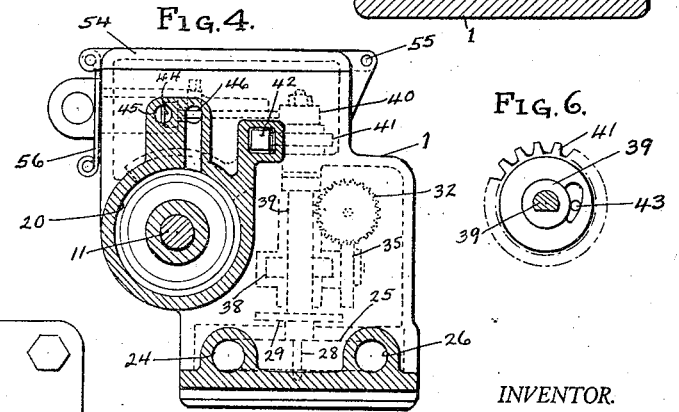
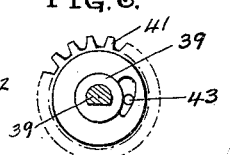
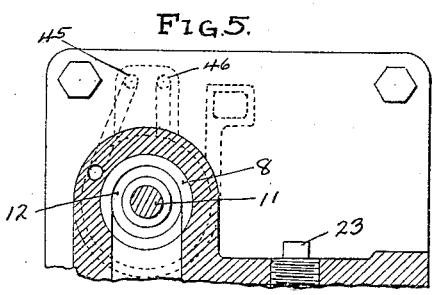
INVENTOR.
DONALD ELDER
BY *Miller Boyken & Bried*
ATTORNEYS.

Patented Mar. 14, 1933

1,901,496

UNITED STATES PATENT OFFICE

DONALD ELDER, OF BERKELEY, CALIFORNIA

SPRINKLER FLOW TIMING APPARATUS

Application filed April 1, 1930. Serial No. 440,748.

This invention relates to apparatus for timing the flow of water to one or more sprinkler heads and has for its objects a dependable construction which will provide for any length of flow desired, shut off automatically and open the valve to one or more succeeding sprinklers while retaining the first one or more closed until a considerable drop in water pressure occurs, and upon which the apparatus automatically resets itself to starting position, and such an apparatus which will dispense with the use of needle valves or minute water orifices and attendant danger of clogging.

In the drawing Fig. 1 is a plan view of the apparatus shown mostly in section.

Fig. 2 is a longitudinal section of the apparatus as seen from the line 2—2 of Fig. 1.

Fig. 3 is a cross section of Fig. 1 taken along the line 3—3 thereof.

Fig. 4 is a cross section of Fig. 1 taken along the line 4—4 thereof.

Fig. 5 is a cross section of a portion of Fig. 2 as seen from the line 5—5 of Fig. 2.

Fig. 6 is an enlarged section of a portion of Fig. 3 as seen from the line 6—6 thereof.

The apparatus comprises a metal housing made of several parts secured together for ease of manufacture and repair, though the number of parts, manner of joining or exact form is a matter of design.

In the drawing the housing 1 includes a main water chamber 2 provided with a water inlet shown with a piece of pipe 3 screwed in place to deliver water from a source of supply, a water outlet 4 for supplying water to one or more sprinkler heads of any desired style, such for instance as lawn sprinklers for golf grounds and the like, while a second water outlet 5 connected to a pipe leads to a similar apparatus as herein described controlling a second sprinkler or sprinklers, and so on to as many sprinklers as may be desired.

The second outlet 5 is controlled by a slide valve 6 shown closed in Fig. 2 and guided on a rod 7, while outlet passage 4 is shown open to chamber 2 and inlet 3 by way of a cylindrical throat 8 adapted to freely receive the cylindrical neck 9 of a lift valve 10 carried on a sliding stem 11 supported in a bearing 12 in the throat member and adapted to seat against the end of and shut off the throat when the valve is slid to the left.

Valve 10 slides along just over valve 6 and is provided with an extension or lug 13 arranged to engage either of two guide lugs 14, 15 of valve 6 for closing valve 6 when valve 10 is open (as shown in Fig. 2) or vice versa.

Valve stem 11 passes through packing rings 16 and is provided with an enlarged head 17 engaged in a socket 18 provided at the end of a hollow piston 19 operating in a cylinder 20 and within which piston is a spiral compression spring 21 arranged for normally forcing the piston and valve stem to the right to hold valve 10 open.

The remote end of spring 21 is seated within a tubular member 22 threaded into the housing so that it may be screwed back and forth to vary the tension of the spring.

With the arrangement thus far described the water entering pipe 3 would flow right out of outlet passage 4, but outlet passage 4 is provided with a variable obstruction taking the form of a screw plug 23 which may be adjusted to divert water from the outlet through a side passage 24 for operating a turbine 25 and return to the outlet 4 through a passage 26 so that all of the water passes to the sprinkler.

Turbine 25 is of the tangential waterwheel type and is revolved by the water stream for the purpose of operating the timing gears which control the duration of flow and which gears comprise a pinion 27 secured to the turbine shaft 28 and engaging a gear 29 on a shaft 30 carrying a worm 31 engaging a wormwheel 32 on a shaft 33 carrying a worm 34 engaging a wormwheel 35 on a shaft 36 carrying a worm 37 engaging a clutch wormwheel 38 on timing cam shaft 39 carrying at its end a cam 40 which is secured thereto and just preceding the cam a clutch gear 41 engaged by a slidable rack 42.

When the turbine revolves, shaft 39, under a tremendous reduction of speed, revolves in direction shown by the arrow in Fig. 3 or clockwise in this view, or counter-clockwise as seen in Fig. 1, and clutch gears 38 and 41 are both fitted with roller clutches indicated in their hubs (as at 43 in Fig. 6) or other form of ratchets so that while they carry the shaft with them when revolved in direction of shaft turning the shaft may nevertheless be turned in the same direction independently of them for the purpose of timing as will later be described.

Cam 40 is for the purpose of opening a small valve 44 at the proper time to open a small water passage 45 which leads from the main water chamber 2 to the valve and thence by way of a passage 46 to a point behind or "under" piston 19 so that when valve 44 is open, water under pressure from chamber 2 will force the piston to the left compressing spring 21 and drawing valve 10 along until its neck 9 enters throat 8 and whereupon the water pressure acting upon the outer surface of valve 10 will quickly close it to thereby shut off all flow to outlet 4 and by the final movement, by reason of the loose relation of lugs 13 and 14, will open slide valve 6 thus opening the second outlet to the second apparatus and sprinklers, and of course hold the parts in such relation as long as the water pressure acts against the outer surface of valve 10.

Water passage 45 is always open to the water pressure in chamber 2 (being continued by coring through the part of the housing forward of the section shown in Fig. 1) and the pressure of water therefrom normally tends to close small valve 44 the motion of which is limited by a combined stop and plug 47 screwed into the housing.

To provide for various time intervals of tripping valve 44 it is of course essential to provide some means of revolving the cam 40 or the cam and its shaft 39 so as to bring the high part of the cam at any desired point of revolution so that the tripping movement will not depend on a complete revolution of the shaft by the timing gears which with the compound reduction shown would take about half an hour, and to this end the clutch gear 41 is provided whereby upon sliding the rack 42 to the right this gear and shaft will be revolved (freely through clutch gear 38) to any degree.

This is effected by providing a sliding clamp 48 on the rack which may be clamped therealong by means of the screw 49 and which clamp is pointed at its end to serve as a time indicator along a scale 50, and the body of the clamp serves as a stop or lug engaged upon return stroke of piston 19 by means of an overlying finger 51 carried by the outer end of the piston, so that when the piston returns to position shown in Fig. 1 it will shove the clamp and rack to the right and thereby revolve the cam and its shaft an amount dependent on the position which the clamp was placed along the rack.

When the piston 19 moves to the left its finger 51 strikes a stop pin 52 at the end of the rack and pulls the rack to the left to thereby re-set the cam for the same length of water flow as before if the clamp 48 is not changed in its setting on the rack.

If desired to lock the piston in extended position this may be done by means of a hook 53 which may be hooked over the edge of finger 51. The upper part of the housing is provided with a lid 54 hinged at 55 to the housing 1 so that the manually adjustable parts may be reached and the lid is provided with a hasp 56 for locking by a padlock to prevent tampering or change of setting.

Valve rod head 17 is free for some longitudinal movement in its socket connection to the piston 19 so as to insure free seating of valve 10.

From the construction described the general operation of the apparatus will be readily understood. With the time setting shown in Fig. 1 the cam 40 would have to make a complete revolution before tripping valve 44, whereas with the rack 42 pushed clear over to the right the cam would have been revolved to almost the point of tripping the valve and hence set for the shortest time of water flow.

To set the clamp 48, it is merely necessary to pull the piston 19 out by grasping finger 51, then re-setting the clamp to proper point on the scale and releasing the piston which will move to the right under influence of spring 21 and carry the rack 42 with it to thereby revolve the cam counter-clockwise (Fig. 1) to the degree determined by the setting of the clamp.

After the valve 44 has been tripped with the resulting closure of valve 10 and opening of valve 6 the water pressure will hold the parts in that relation as long as there is a sufficient water pressure in the pipe line and consequently in chamber 2. Therefore, assuming a lot of these devices to be installed in series in a sprinkler system, after the last one closes all will remain closed until such time as the water service is shut off ahead of the first device and the water pressure in the system broken as by opening any relief valve somewhere on the system, and whereupon all of the devices will automatically be re-set through the energy of their springs 21.

From a consideration of the above described mechanism it will be evident that changes may be made in details of construction without departing from the spirit of the invention and as may come within the scope of the appended claims.

I claim:

1. A water flow timing apparatus comprising a housing provided with a main water chamber having an inlet, an outlet passage and a second outlet, associated valves, one for closing each outlet, automatically operated means for opening one valve and closing the other, water operated means for reversing the position of the valves, a controlling valve for said water operated means, timing gears operated by flow of water arranged to open said controlling valve at a predetermined time interval, and rack and pinion means for changing the setting of said timing gears.

2. A water flow timing apparatus comprising a housing provided with a main water chamber having an inlet, an outlet passage and a second outlet, associated valves, one for closing each outlet, automatically operated means for opening one valve and closing the other, water operated means for reversing the position of the valves, a controlling valve for said water operated means, timing gears including a revolvable cam for moving the controlling valve operated by flow of water arranged to open said controlling valve at a predetermined time interval, and rack and pinion means for changing the setting of said cam.

3. A water flow timing apparatus comprising a housing having a water passage extending therethrough, a valve for closing the passage against any water passing through the apparatus, a water-wheel, a water channel extending to the wheel from said passage and returning thereto at a point further along the flow, and timing gears operated by said water-wheel arranged to cause actuation and closure of said valve.

4. A water flow timing apparatus comprising a housing having a water passage extending therethrough, a valve for closing the passage against any water passing through the apparatus, a water-wheel, a water channel extending to the wheel from said passage and returning thereto at a point further along the flow, timing gears operated by said water-wheel arranged to cause actuation and closure of said valve, and an adjustable obstruction in said water passage arranged to divert a portion of water from said passage to said channel.

5. A water flow timing apparatus comprising a housing provided with a chamber having an inlet and an outlet water passage, an outlet valve provided with a stem and slidably arranged to close said outlet water passage, a piston operative in a bore and engaging the end of the valve stem, means resiliently urging said piston in a direction to open said outlet valve, a water passage provided with a controlling valve leading from a water pressure space to said piston for urging same to close the outlet valve, and timing means operated by the water flow arranged to trip said controlling valve at a predetermined time interval and whereby said outlet valve is closed.

6. A water flow timing apparatus comprising a housing provided with a chamber having an inlet and an outlet water passage, an outlet valve provided with a stem and slidably arranged to close said outlet water passage, a piston operative in a bore and engaging the end of the valve stem, a coiled spring urging said piston in a direction to open said outlet valve, a water passage provided with a controlling valve leading from a water pressure space to said piston for urging same to close the outlet valve, and timing means operated by the water flow arranged to trip said controlling valve at a predetermined time interval and whereby said outlet valve is closed, the power of said spring and arrangement being such as to open said outlet valve upon a drop of water pressure in said chamber.

7. A water flow timing apparatus comprising a housing provided with a chamber having an inlet and an outlet water passage, an outlet valve provided with a stem and slidably arranged to close said outlet water passage, a piston operative in a bore and engaging the end of the valve stem, a coiled spring urging said piston in a direction to open said outlet valve, a water passage provided with a controlling valve leading from a water pressure space to said piston for urging same to close the outlet valve, and timing means operated by the water flow arranged to trip said controlling valve at a predetermined time interval and whereby said outlet valve is closed, the power of said spring and arrangement being such as to open said outlet valve upon a drop of water pressure in said chamber, a closed end threaded tube receiving the outer end of said spring and adjustable in said housing for varying the pressure of said spring.

8. In a construction as specified in claim 5, said timing means including a water-wheel operated by water flow through the apparatus, a revolvable cam for tripping said controlling valve, and a compound reduction gear train connecting said water-wheel to said cam.

9. In a construction as specified in claim 5, said timing means including a water-wheel operated by water flow through the apparatus, a revolvable cam for tripping said controlling valve, a compound reduction gear train connecting said water-wheel to said cam, and manually operated means for setting said cam independent of the timing gear train.

10. In a construction as specified in claim 5, said timing means including a water-wheel operated by water flow through the apparatus, a revolvable cam for tripping said controlling valve, a compound reduction gear train connecting said water-wheel to said cam, and manually operated means for setting said cam independent of the timing gear train including a shaft upon which the cam is mounted revolved by the timing gears but arranged to turn free in forward direction, and ratchet means for turning the shaft to desired degree for predetermining the timing.

11. In a construction as specified in claim 5, means for latching said piston in extended position.

12. In a construction as specified in claim 5, the engagement of said piston to said valve stem being such as to provide for limited independent motion of said outlet valve.

13. In a water flow timing apparatus, a shut-off valve, a controlling valve for said shut-off valve, a revolvable cam operative on said controlling valve, a train of reduction gears and a driving water-wheel for same operatively connected with said cam, and means for independently revolving the cam to determine the time at which the controlling valve will be actuated.

14. In a water flow timing apparatus, a shut-off valve, a controlling valve for said shut-off valve, a revolvable cam operative on said controlling valve, a train of reduction gears and a driving water-wheel for same operatively connected with said cam, means for independently revolving the cam to determine the time at which the controlling valve will be actuated comprising a gear mounted to revolve the cam, a slidable rack engaging the gear and means for determining the amount of sliding of said rack.

15. In a water flow timing apparatus, a shut-off valve, a controlling valve for said shut-off valve, a revolvable cam operative on said controlling valve, a train of reduction gears and a driving water-wheel for same operatively connected with said cam, means for independently revolving the cam to determine the time at which the controlling valve will be actuated comprising a gear mounted to revolve the cam, a slidable rack engaging the gear, means for determining the amount of sliding of said rack, and means for automatically sliding the rack upon each opening of the shut-off valve.

DONALD ELDER.